(12) United States Patent
Susan

(10) Patent No.: US 8,457,301 B2
(45) Date of Patent: Jun. 4, 2013

(54) MULTI-FREQUENCY TONE DETECTOR

(75) Inventor: Adrian Susan, Orastie (RO)

(73) Assignee: Freescale Semiconductor, Inc., Austin, TX (US)

( * ) Notice: Subject to any disclaimer, the term of this patent is extended or adjusted under 35 U.S.C. 154(b) by 183 days.

(21) Appl. No.: 12/997,991

(22) PCT Filed: Jun. 30, 2008

(86) PCT No.: PCT/IB2008/052620
§ 371 (c)(1),
(2), (4) Date: Dec. 14, 2010

(87) PCT Pub. No.: WO2010/001193
PCT Pub. Date: Jan. 7, 2010

(65) Prior Publication Data
US 2011/0103573 A1    May 5, 2011

(51) Int. Cl.
*H04M 3/00* (2006.01)
*H04M 5/00* (2006.01)

(52) U.S. Cl.
USPC ........................................ 379/283

(58) Field of Classification Search
USPC ........................................ 379/283
See application file for complete search history.

(56) References Cited

U.S. PATENT DOCUMENTS

| | | | |
|---|---|---|---|
| 5,097,221 A * | 3/1992 | Miller | 329/318 |
| 5,765,125 A | 6/1998 | Daugherty et al. | |
| 2002/0080954 A1 * | 6/2002 | Felder et al. | 379/386 |
| 2004/0047370 A1 | 3/2004 | Pessoa et al. | |
| 2005/0195967 A1 | 9/2005 | Pessoa et al. | |
| 2006/0098806 A1 * | 5/2006 | Schulz | 379/395.01 |
| 2007/0110263 A1 * | 5/2007 | Brox | 381/110 |
| 2007/0263842 A1 | 11/2007 | Pessoa | |
| 2007/0265791 A1 * | 11/2007 | Valadon | 702/76 |

FOREIGN PATENT DOCUMENTS

WO    97/46030 A    12/1997

OTHER PUBLICATIONS

Velez Edgar F: "Detection of Multi-Tone Signals Based on Energy Operators" Time-Frequency and Time-Scale Analysis, 1994., Proceedings of the IEEE-SP International Symposium, Philadelphia, PA, USA, Oct. 25-28, 1994, pp. 229-232.
International Search Report and Written Opinion correlating to PCT/IB2008/052620 dated Feb. 5, 2009.

* cited by examiner

*Primary Examiner* — Alexander Jamal

(57) ABSTRACT

A tone detector for detecting a tone having a plurality of targeted frequencies comprises a first filter bank providing frequency estimates for an initial indication of a presence of each of the targeted frequencies; a second filter bank being controlled by the frequency estimates and comprising a plurality of filters operating in different frequency bands, each frequency band comprising at least one of the targeted frequencies, each of the filters providing a modified signal; a third filter bank extracting a noise signal from the input signal; a plurality of level control units (LCU) providing normalized modified signals having a constant amplitude; a power estimation module providing a power estimation parameter for each of the modified signals and the noise signal; and a discrimination module controlling a plurality of demodulator modules, each of the demodulator units providing a fine estimate of one of the targeted frequencies.

20 Claims, 3 Drawing Sheets

MULTI-FREQUENCY TONE DETECTOR

FIELD OF THE INVENTION

This invention in general relates to tone detection, and more specifically to a multi-frequency tone detector and method for detecting a multi-frequency tone.

BACKGROUND OF THE INVENTION

In many communication systems, tones composed of multiple sinusoidal components are used for signalling. For example, Dual Tone Multiple Frequency (DTMF) signalling is a technique using a set of signalling tones with each tone being composed of two frequency components. In telephone systems, DTMF can be used for tone dialing. A key pressed on a telephone set generates a dual-frequency tone composed of a low frequency and a high frequency component. Other examples of signalling techniques having signalling tones being composed of multiple sinusoidal components are, for example, Multiple Frequency MF-R1 and MF-R2. Another example is a telephone off-hook warning tone that may be generated using multiple (e.g. four) frequency components.

Tone detectors are frequently used in communication systems for monitoring received signals and identifying a presence of pre-defined signalling tones. There are many practical situations, however, when signalling tones are highly corrupted by noise, which may end up disrupting expected tone detection functionality. Tone detection methods often handle noisy situations by post-processing with low-pass filters. However, due to frequency and timing tolerance requirements, false detection rates tend to increase as noise distortion increases beyond critical levels. A correct detection and identification of a tone received on a transmission channel, e.g. a telephone line, is achieved by accurately estimating frequencies contained in the tone, considering transmission aspects, for example noise, network distortions, and distinction between signalling tones and tone-like speech etc.

An approach for multi-component tone detection can be based on transforming the received signal into a frequency domain, for example using standard Fourier Transform methods. However, some of these methods are generally not applicable to more than two components, some allow handling of DTMF signalling only, are of very high complexity or require too much time for tone detection.

Other approaches are available, detecting multi-component tones based on the evaluation of polynomial filters results, for example energy operators as described in the document "Detection of multi-tone signals based on energy operators", 1994 IEEE 0-7803-2127-8/94 by E. F. Velez. It describes a nonlinear approach based on the Teager-Kaiser energy operator for multi-tone detection in the presence of voice. The shown approach is limited to detecting signals with two frequency components.

The document US 2004/0047370 A1 discloses a method for multicomponent tone detection based on Teager-Kaiser energy operators as described by Velez.

The document US 2005/0195967 A1 describes a tone event detector, which first determines whether the presence of a tone is indicated on the input signal, and then, based on this determination, selectively determines whether a tone has been detected on the input signal.

The document US 2007/0263842 A1 discloses an enhanced tone detector including an adaptive multi-bandpass filter improving tone detection and enhancing performance during noisy signalling conditions.

SUMMARY OF THE INVENTION

The present invention provides a tone detector and a method for detecting a multi-frequency tone as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale. Identical reference numerals in different figures refer to identical or similar components.

DETAILED DESCRIPTION OF THE PREFERRED EMBODIMENTS

Figure 1:
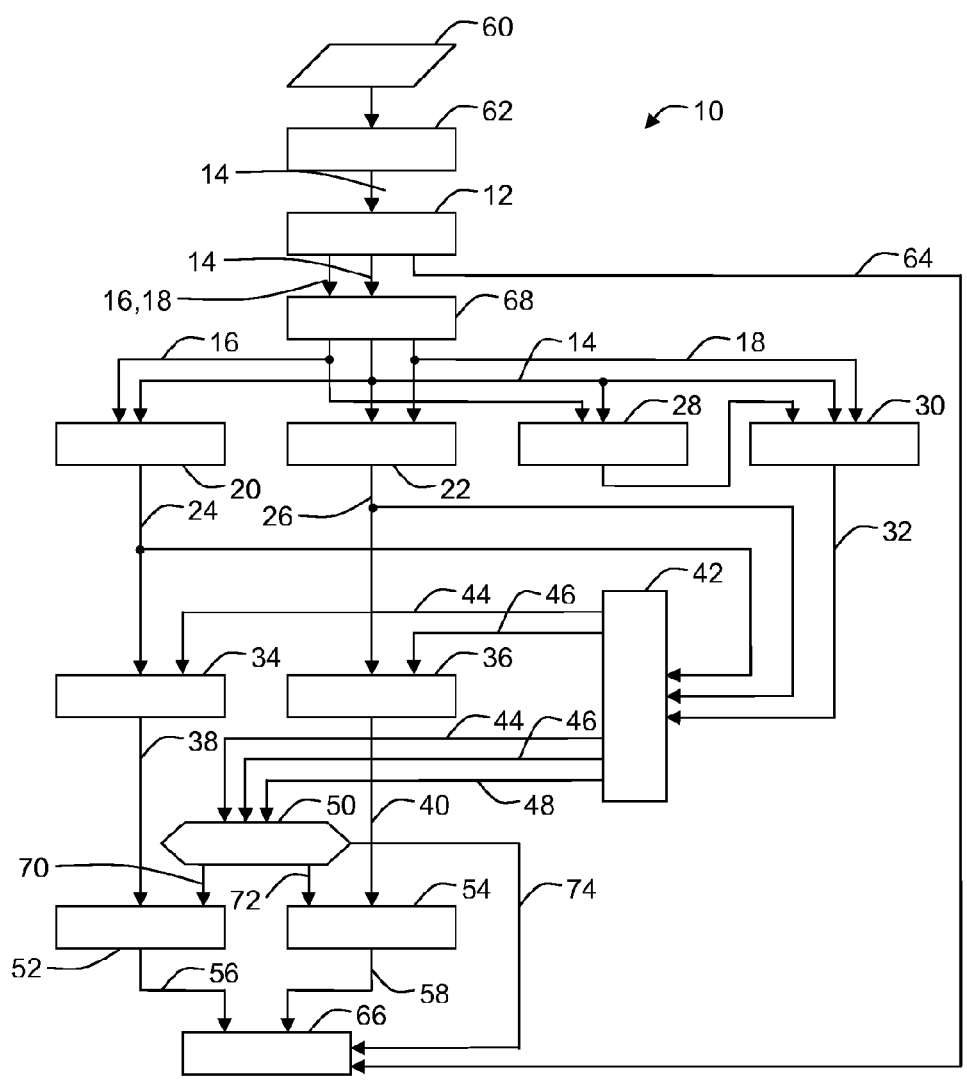
FIG. 1 schematically shows a block diagram of an example of an embodiment of a tone detector.

Referring to FIG. 1, a block diagram of an example of an embodiment of a tone detector 10 for detecting a tone having a plurality of targeted frequencies is shown, comprising a first filter bank 12 receiving an input signal 14 and providing frequency estimates 16, 18 for an initial indication of a presence of each of the targeted frequencies; a second filter bank 20, 22 receiving the input signal 14 and being controlled by the frequency estimates 16, 18 and comprising a plurality of filters 20, 22 operating in different frequency bands, each frequency band comprising at least one of the targeted frequencies, each of the filters providing a modified signal 24, 26; a third filter bank 28, 30 receiving the input signal 14 and being controlled by the frequency estimates 16, 18 and extracting a noise signal 32 from the input signal; a plurality of level control units (LCU) 34, 36 receiving the modified signals 24, 26 and providing normalized modified signals 38, 40 having a constant amplitude; a power estimation module 42 providing a power estimation parameter 44, 46, 48 for each of the modified signals 24, 26 and the noise signal 32; and a discrimination module 50 receiving the power estimation parameters 44, 46, 48 and controlling a plurality of demodulator modules 52, 54 receiving the normalized modified signals 38, 40, each of the plurality of demodulator units providing a fine estimate 56, 58 of one of the targeted frequencies. The shown embodiment of a tone detector uses a quick detection technique for an initial frequency estimation and then employs a highly sensitive technique in order to achieve a highly reliable and accurate detection result.

The tone detector 10 receives a sampled input signal 60, for example sampled every 5 ms. In order to suppress a possible dial tone interference, the signal is then filtered using notch filters 62 having notch frequencies corresponding to the dial tone frequencies of the actual communication system the tone detector is applied to. A notch filter is a band-stop filter or band-rejection filter, i.e. a filter that passes most frequencies unaltered, but attenuates those in a specific range to very low levels, with a very narrow stop band.

This dial tone free signal is then applied to the first filter bank 12 as the input signal 14. A filter bank is an array of band-pass filters that separates the input signal into several components, each one carrying a single frequency subband of the original signal. The first filter bank is used for at least coarse frequency estimation, i.e. it may output a rough estimation, which of the frequencies of the used tone format are contained in the received input signal. The number of different frequencies used for generation of tones in a certain tone format may determine the number of filters required for the first filter bank. For example, a first filter bank for DTMF detection may contain eight filters, since DTMF tones are generated using eight different frequencies, four belonging to a low frequency band and four belonging to a high frequency band. In case no expected frequency component is found, the tone detector bypasses 64 all other stages of its signal processing chain and delivers the information to a decision logic module 66 which may, for example, decide to move on to the next tone, to abort detection or to switch the detector to a detection of a different tone format. In case the first filter bank 12 delivers frequency estimates 16, 18, i.e. an indication that certain frequencies used in the tone format may be contained in the input signal, these frequency estimates may be the filter coefficients of the second 18, 20 and third 28, filter bank. A module 68 may be used for assigning the correct filter coefficients to their corresponding filters of the second and third filter bank. This module may be a separate module or may be part of the first filter bank. If the first filter bank delivers frequency estimates that can not be directly applied as filter coefficients, module 68 may comprise a conversion unit for generating filter coefficients corresponding to the determined frequency estimates.

The second filter bank 20, 22 may comprise filters for different frequency bands. For example, for DTMF the second filter bank may have a low frequency filter 20 and a high frequency filter 22, corresponding to the set of four low DTMF frequencies and the set of four high DTMF frequencies. By applying the corresponding frequency estimates 16, 18 or filter coefficients derived from these estimates, filters 20, 22 are tuned to provide modified signals 24, 26, i.e. modified versions of the input signal emphasizing a contained dominant frequency component. Therefore, the second filter bank 20, 22 may comprise adaptive peak filters. A peak filter is a variation of a bandpass filter that, instead of attenuating all frequencies outside the passband, typically leaves them at a gain of about 0 dB. The filter applies a known gain in the passband. The further away from the passband, the less the signal is modified. The frequency estimates provided by the first filter bank are used for tuning the peak filters' passbands depending on the detected targeted frequencies.

In order to compute a background noise level, the third filter bank 28, 30 uses cascaded filters, each being tuned on suppressing a targeted frequency according to the indication provided by the first filter bank. Therefore, the third filter bank 28, 30 may comprise notch filters. The used notch filters may attenuate the frequency ranges of the input signal the second filter bank emphasises, hence allowing for isolating the background noise contained in the input signal and delivering only the noise signal.

The modified signals and the noise signal are evaluated by the described power estimation module 42. It receives the modified signals and noise signal and estimates the signal powers of the received signals, calculates a ratio of a signal power to a noise power (SNR) and outputs the power estimates 44, 46 and SNR 48 as parameters characterizing the received modified signals. Although the described system uses a power estimation module for generating power estimation parameters by evaluation the signal power of received modified signals and noise signal, a calculation of other parameters specifically characterizing the received signals is possible and within the scope of the presented embodiment.

The power estimation module is connected to a set of level control units (LCUs) 34, 36, one for each modified signal. The application of LCUs may reduce a filter's ring and a dependency of filters following in the processing chain on amplitude level variations of the signal. For DTMF, one LCU is used for the low frequency modified signal, one for the high frequency modified signal. Each LCU receives a modified signal and a corresponding power estimate and outputs a normalized modified signal 38, 40 having a constant amplitude. Therefore, each LCU may comprise two stages, a first LCU stage for building a discrete temporal envelope of the absolute values of the received modified signal by searching for local maximums as points where a first derivative of the received modified signal changes its sign from positive to negative, and a second LCU stage for dividing the received modified signal by a scaled version of a continuous temporal envelope derived from the discrete version, for example using linear interpolation, in order to obtain a normalized modified signal having a constant amplitude. The plurality of LCUs 34, 36 may also match a duration of the normalized modified signals 38, 40 to a duration of the input signal 14. This may help avoid a drift between input and output of the tone detector and support generation of time accurate results.

Each LCU 34, 36 is connected to a corresponding demodulator module 52, 54. However, demodulation is only performed, if the discrimination module 50 applies an enabling parameter 70, 72 to the demodulator modules. The discrimination module 50 controls the demodulator modules. It evaluates parameters of the input signal in order to avoid false detection of tones. It receives the power estimation parameters 44, 46, 48 determined by the power estimation module 42 and may compare them directly to one or more predefined threshold values. The discrimination module 50 may also control the demodulator modules 52, 54 based on an evaluation of at least one of a plurality of parameters derived from the power estimation parameters (44, 46, 48). Parameters may be derived according to pre-defined parameters provided by a tone signalling standard, for example ITU-T Q.24 or MF-R2, used for the tone format of the actual system. The threshold values to be applied may also depend on the expected signalling format of the received tones. For Q.24 compliant DTMF signalling, parameters may be derived and threshold values may be chosen according to the Q.24 standard recommended by the ITU-T, i.e. the Telecommunication Standardization Sector (ITU-T) coordinating standards for telecommunications on behalf of the International Telecommunication Union (ITU). The discrimination module either enables the demodulator modules 52, 54 to process the received normalized modified signals 38, 40, or it reports a failed power estimation parameter check to the decision logic module 66.

The demodulator modules 52, 54 perform an AM-FM demodulation of the normalized modified input signals, providing an amplitude and frequency information for each normalized modified input signal and therefore for each component of the input signal 14 applied to the tone detector. The demodulator modules 52, 54 may provide the fine estimates 56, 58 of the targeted frequencies by determining energy operators for the fine estimates. Due to the preceding pre-processing, a very accurate adaptation of the energy operators to the input signal may be achieved, even when received under noisy conditions. The energy operators may be provided by polynomial filters, such as Teager-Kaiser filters. An energy operator may be defined as $$\Psi[x(n)] = x(n)^2 - x(n+1) \cdot x(n-1), \quad (\text{eq. 1})$$

which for sinusoidal signals $$x(n) = A \cdot \cos(\Omega n + \phi) \quad (\text{eq. 2})$$

is given by $$\Psi[x(n)] = A^2 \cdot \sin^2(\Omega), \quad (\text{eq. 3})$$

wherein x(n) is a sampled version of the received signal, A the signal amplitude, $\Omega$ the normalized frequency, $\phi$ a phase shift, and n a discrete sampling time. Therefore, for detection, eq. 3 provides the frequency information, if the amplitude remains constant.

An evaluation of the fine estimates 56, 58 of detected frequencies provided by the demodulator modules and a mapping against predefined values then allows for an identification of a predefined tone consisting of the detected frequency components. Therefore, the tone detector may comprise a decision logic module 66 receiving the fine estimates 56, 58 of the targeted frequencies, comparing the fine estimates with predefined values and providing a tone detection result. The decision logic module may also receive the power estimation check failure indication 74 sent by the discrimination module 50 and the failure notification 64 of not detecting any coarse frequency estimate according to the expected tone format in the input signal 14 the first filter bank 12 may issue.

It should be noted that any "unit" or "module" being part of the described tone detector could be considered as a signal filter or filter bank, too.

The predefined values may be standardized values defined according to a recommendation by the International Telecommunications Union (ITU). ITU is an international organization established to standardize and regulate international radio and telecommunications. For DTMF signalling, ITU-T defined the Q.24 standard. However, other tone formats may require other standards, e.g. MF-R2 or MF-R1.

The first filter bank 12 mentioned above may comprise Goertzel filters. A Goertzel filter is a signal filter allowing to process the input signal according to Goertzel's algorithm. The Goertzel algorithm is a digital signal processing technique for identifying frequency components of a signal, published by Dr. Gerald Goertzel in 1958. While the general Fast Fourier transform (FFT) algorithm computes evenly across the bandwidth of the incoming signal, the Goertzel algorithm looks at specific, predetermined frequency. The Goertzel algorithm computes a sequence s(n), given an input sequence x(n), as s(n)=x(n)+2 cos(2πω)s(n-1)-s(n-2), where s(-2)=s(-1)=0 and ω0 is some frequency of interest (for example a targeted frequency of a tone to be detected), in cycles per sample, which should be less than ½. This effectively implements a second-order infinite impulse response (IIR) filter with poles at $e^{+2\pi i\omega}$ and $e^{-2\pi i\omega}$, and requires only one multiplication (assuming 2 cos(2πω) is pre-computed), one addition and one subtraction per input sample. Therefore it can be used as a fast and easy to implement filter for a coarse frequency estimation of the input signal. For real inputs, the operations are real. For efficient implementation, values for the term 2 cos(2πω) may be provided by a look-up table assigned to the first filter bank. For DTMF tone detection a bank of Goertzel filters may comprise 8 filters, one for each of the DTMF frequencies. Instead of Goertzel filters, other signal filters may be used, for example based on a Discrete Fourier Transform (DFT) or a Fast Fourier Transform (FFT), a Discrete Cosine Transform (DCT), a Wavelet Transform etc.

The plurality of parameters derived from the power estimation parameters received by the discrimination module 50 may comprise a twist of the targeted frequencies, a signal-to-noise ratio (SNR) 48 of the modified signals and the noise signal, and a minimum level of the power estimation parameters 44, 46. Twist is a parameter defining the difference in amplitude levels between two frequencies contained within a tone. For example, this parameter is used for DTMF tones. In the U.S., the two frequencies are generated at equal levels, but the frequency response of the telephone network often causes one of the frequencies to be attenuated more than the other. Thus, if this difference in attenuation were 1 dB, the DTMF signal that arrives at a receiver is said to have a twist of 1 dB. In other countries, a predetermined twist may be used at initial signal generation. The signal-to-noise ratio is a term for the power ratio between a meaningful signal and the background noise. The term noise refers to any signal component not belonging to a tone to be detected. For example, on a telephone line speech is considered noise in this context. The SNR may be expressed in terms of a logarithmic decibel scale, since signals may have a wide dynamic range. When expressed in dB, the SNR is calculated as a difference of modified signal power(dBm0) and noise power(dBm0). The received estimated power levels are compared with minimum values. Parameters are evaluated by checking, if a certain threshold is met, otherwise a false detection is assumed and demodulation may not be enabled by the discrimination module 50. For example, an SNR≧14 dB may be used for avoiding false detection on speech etc.

The presented tone detector is capable of detecting tones comprising multiple frequency components according to any tone format having standardized parameters. It is not restricted to tones having two frequency components. However, the tone to be detected may be a dual-tone multi-frequency (DTMF) signalling tone. DTMF signalling is widely used for telephone signalling over the line in the voice-frequency band to a call switching centre. ITU-T recommendations Q.23 and Q.24 are standards defining DTMF. A DTMF system uses eight different frequency signals (low frequency set: 697 Hz, 770 Hz, 852 Hz, 941 Hz; high frequency set: 1209 Hz, 1336 Hz, 1477 Hz, 1633 Hz) transmitted in pairs to represent sixteen different numbers, symbols and letters. The ITU-T Q.24 specification specifies tolerances for parameters of an input signal fed into a DTMF detector. An implementation of the detector or a method of detection is not specified in the standard. Therefore, an example embodiment of the presented tone detector may be a Q.24 compliant tone detector.

Figure 2:
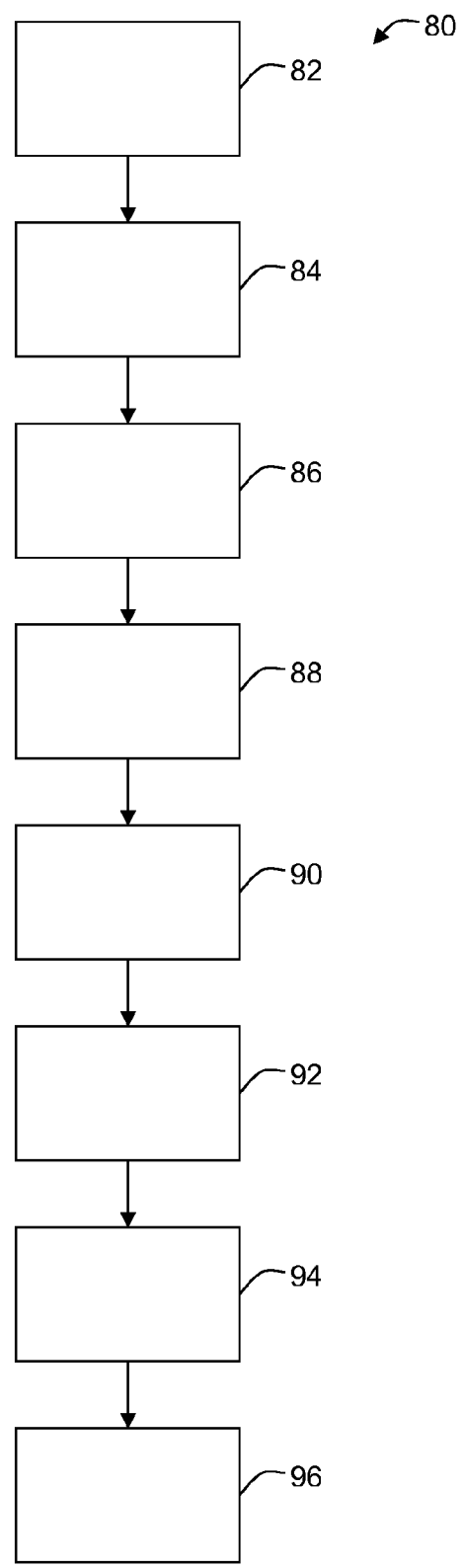
FIG. 2 schematically shows a flow diagram of an example of an embodiment of a method for tone detection.

Referring now to FIG. 2, a schematic flow diagram of an example of an embodiment of a method for tone detection is shown. The illustrated method 80 for detecting a tone having a plurality of targeted frequencies comprises applying 82 an input signal 14 to a first filter bank 12 and providing 84 a frequency estimate 16, 18 for an initial indication of a presence of each of the targeted frequencies; providing 86 the input signal 14 to a second filter bank 20, 22 being controlled by the frequency estimate and comprising a plurality of filters operating in different frequency bands, each frequency band comprising at least one of the targeted frequencies, each of the filters providing a modified signal 24, 26; providing 88 the input signal 14 to a third filter bank 28, 30 being controlled by the frequency estimate and extracting a noise signal 32 from the input signal; providing 90 the modified signals to a plurality of level control units (LCU) 34, 36 providing normalized modified signals 38, 40 having a constant amplitude; providing 92 each of the modified signals and the noise signal to a power estimation module 42 providing a power estimation parameter 44, 46, 48 for each of the modified signals and the noise signal; providing 94 the power estimation parameters to a discrimination module 50 controlling a plurality of demodulator modules 52, 54 receiving the normalized modified signals, each of the plurality of demodulator modules providing 96 a fine estimate 56, 58 of one of the targeted frequencies.

The described method allows implementing the advantages and characteristics of the described tone detector as part of a method for detecting a tone having a plurality of targeted frequencies.

The method allows performing tone (for example DTMF) detection and may comprise the filtering of a sampled signal with a first filter (for example a Goertzel filter) to provide a coarse frequency estimate; using the coarse frequency estimate to control a second filter (for example a peak filter); filtering the sampled signal with the second filter to provide a modified digital signal; computing specific parameters (for example SNR) using the signals from above to discriminate between expected tone signals (for example DTMF signals) and other signals that can cause false detections; adjusting the level of the modified signal using a module (LCU) that normalizes it to a constant amplitude and matches the input signal duration; filtering the normalized modified signal with a third filter (for example based on an evaluation of energy operators) to provide a fine frequency estimate.

Figure 3:
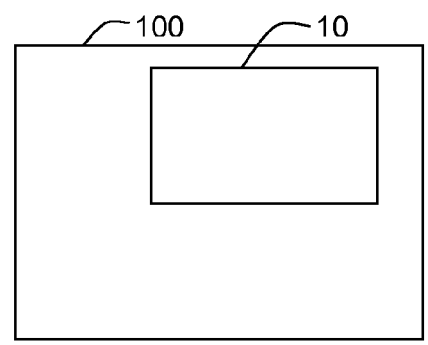
FIG. 3 schematically shows a block diagram of an example of an embodiment of a telecommunications apparatus comprising a tone detector.

Referring now to FIG. 3, a schematic block diagram of an example of an embodiment of a telecommunications apparatus comprising a tone detector is shown. A telecommunications apparatus 100 may comprise a tone detector 10 or may use a method 80 for detecting a tone having a plurality of targeted frequencies as described above. Any apparatus using tone signalling and therefore requiring a tone detector or tone detection method as described above is within the scope of the invention.

For example, the telecommunications apparatus 100 may be a media gateway, a telephone exchange, or a private branch exchange (PBX). A media gateway acts as a translation unit between disparate telecommunications networks such as the public switched telephone network (PSTN) and 2G—(e.g. GSM—global system for mobile communications), 2.5G—(e.g. GPRS—general packet radio service) or 3G—(e.g. UMTS—universal mobile telecommunications system) radio networks. A telephone exchange or telephone switch is a system of electronic components that connects telephone calls within a telecommunications network. A private branch exchange (PBX) is a telephone exchange dedicated to serving a particular business or office, as opposed to one that a common carrier or telephone company operates for many businesses or for the general public.

A computer program product may comprise code portions for executing steps of a method for tone detection as described above, when run on a programmable apparatus.

Furthermore, a computer program product may comprise code portions for implementing parts of a detector as described above, when run on a programmable apparatus.

An operating system (OS) is the software that manages the sharing of the resources of a computer and provides programmers with an interface used to access those resources. An operating system processes system data and user input, and responds by allocating and managing tasks and internal system resources as a service to users and programs of the system.

The invention may also be implemented in a computer program for running on a computer system, at least including code portions for performing steps of a method according to the invention when run on a programmable apparatus, such as a computer system or enabling a programmable apparatus to perform functions of a device or system according to the invention. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system. The computer program may be provided on a data carrier, such as a CD-rom or diskette, stored with data loadable in a memory of a computer system, the data representing the computer program. The data carrier may further be a data connection, such as a telephone cable or a wireless connection.

In the foregoing specification, the invention has been described with reference to specific examples of embodiments of the invention. It will, however, be evident that various modifications and changes may be made therein without departing from the broader spirit and scope of the invention as set forth in the appended claims. For example, the connections may be any type of connection suitable to transfer signals from or to the respective nodes, units or devices, for example via intermediate devices. Accordingly, unless implied or stated otherwise the connections may for example be direct connections or indirect connections.

Each signal described herein may be designed as positive or negative logic, where negative logic can be indicated by a bar over the signal name or an asterix (*) following the name. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

The term "program," as used herein, is defined as a sequence of instructions designed for execution on a computer system. A program, or computer program, may include a subroutine, a function, a procedure, an object method, an object implementation, an executable application, an applet, a servlet, a source code, an object code, a shared library/dynamic load library and/or other sequence of instructions designed for execution on a computer system.

Some of the above embodiments, as applicable, may be implemented using a variety of different information processing systems. For example, although FIG. 1 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Also for example, in one embodiment, the illustrated elements of detector 10 are circuitry located on a single integrated circuit or within a same device. Alternatively, detector 10 may include any number of separate integrated circuits or separate devices interconnected with each other. Also for example, detector 10 or portions thereof may be soft or code representations of physical circuitry or of logical representations convertible into physical circuitry. As such, detector 10 may be embodied in a hardware description language of any appropriate type.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

All or some of the software described herein may be received elements of detector 10, for example, from computer readable media such as memory or other media on other computer systems. Such computer readable media may be permanently, removably or remotely coupled to an information processing system such as detector 10. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

In one embodiment, detector 10 is a computer system such as a personal computer system. Other embodiments may include different types of computer systems. Computer systems are information handling systems which can be designed to give independent computing power to one or more users. Computer systems may be found in many forms including but not limited to mainframes, minicomputers, servers, workstations, personal computers, notepads, personal digital assistants, electronic games, automotive and other embedded systems, cell phones and various other wireless devices. A typical computer system includes at least one processing unit, associated memory and a number of input/output (I/O) devices.

A computer system processes information according to a program and produces resultant output information via I/O devices. A program is a list of instructions such as a particular application program and/or an operating system. A computer program is typically stored internally on computer readable storage medium or transmitted to the computer system via a computer readable transmission medium. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

Also, the invention is not limited to physical devices or units implemented in non-programmable hardware but can also be applied in programmable devices or units able to perform the desired device functions by operating in accordance with suitable program code. Furthermore, the devices may be physically distributed over a number of apparatuses, while functionally operating as a single device.

Also, devices functionally forming separate devices may be integrated in a single physical device. For example, first, second and third filter banks may be implemented as a single device in order to reduce any transmission line distortion.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements The mere fact that certain measures are recited in mutually different claims does not indicate that a combination of these measures cannot be used to advantage.

While the principles of the invention have been described above in connection with specific apparatus, it is to be clearly understood that this description is made only by way of example and not as a limitation on the scope of the invention.

The invention claimed is:

1. A tone detector for detecting a tone having a plurality of targeted frequencies, comprising:
   a first filter bank receiving an input signal and providing frequency estimates for an initial indication of a presence of each of said targeted frequencies;
   a second filter bank receiving said input signal and being controlled by said frequency estimates and comprising a plurality of filters operating in different frequency bands, each frequency band comprising at least one of said targeted frequencies, each of said filters providing a modified signal;
   a third filter bank receiving said input signal and being controlled by said frequency estimates and extracting a noise signal from said input signal;
   a plurality of level control units (LCU) receiving said modified signals and providing normalized modified signals having a constant amplitude;
   a power estimation module providing a power estimation parameter for each of said modified signals and said noise signal; and
   a discrimination module receiving said power estimation parameters and controlling a plurality of demodulator modules receiving said normalized modified signals, each of said plurality of demodulator units providing a fine estimate of one of said targeted frequencies.

2. The tone detector as claimed in claim 1, comprising a decision logic module receiving said fine estimates of said targeted frequencies, comparing said fine estimates with predefined values and providing a tone detection result.

3. The tone detector as claimed in claim 2, wherein said predefined values are standardized values defined according to a recommendation by the International Telecommunications Union (ITU).

4. The tone detector as claimed in claim 1, wherein said first filter bank comprises Goertzel filters.

5. The tone detector as claimed in claim 1, wherein said second filter bank comprises adaptive peak filters.

6. The tone detector as claimed in claim 1, wherein said third filter bank comprises notch filters.

7. The tone detector as claimed in claim 1, wherein said plurality of LCUs matches a duration of said normalized modified signals to a duration of said input signal.

8. The tone detector as claimed in claim 1, wherein said discrimination module controls said demodulator modules based on an evaluation of at least one of a plurality of parameters derived from said power estimation parameters.

9. The tone detector as claimed in claim 8, wherein said plurality of parameters comprises a twist of said targeted frequencies, a signal-to-noise ratio (SNR) of said modified signals and said noise signal, and a minimum level of said power estimation parameters.

10. The tone detector as claimed in claim 1, wherein said demodulator modules provide said fine estimates of said targeted frequencies by determining energy operators for said fine estimates.

11. The tone detector as claimed in claim 1, wherein said tone is a dual-tone multi-frequency (DTMF) signalling tone.

12. A method for detecting a tone having a plurality of targeted frequencies, comprising:
    applying an input signal to a first filter bank; and
    providing a frequency estimate for an initial indication of a presence of each of said targeted frequencies;
    providing said input signal to a second filter bank being controlled by said frequency estimate and comprising a plurality of filters operating in different frequency bands, each frequency band comprising at least one of said targeted frequencies, each of said filters providing a modified signal;
    providing said input signal to a third filter bank being controlled by said frequency estimate and extracting a noise signal from said input signal;
    providing said modified signals to a plurality of level control units (LCU) providing normalized modified signals having a constant amplitude;
    providing each of said modified signals and said noise signal to a power estimation module providing a power estimation parameter for each of said modified signals and said noise signal;
    providing said power estimation parameters to a discrimination module controlling a plurality of demodulator modules receiving said normalized modified signals, each of said plurality of demodulator modules providing a fine estimate of one of said targeted frequencies.

13. A telecommunications apparatus, comprising a tone detector as claimed in claim 1.

14. The telecommunications apparatus as claimed in claim 13, wherein said apparatus is a media gateway, a telephone exchange, or a private branch exchange (PBX).

15. A computer program product, comprising code portions for executing steps of a method for detecting a tone having a plurality of targeted frequencies, when run on a programmable apparatus, the steps comprising:
    applying an input signal to a first filter bank;
    providing a frequency estimate for an initial indication of a presence of each of said targeted frequencies;
    providing said input signal to a second filter bank being controlled by said frequency estimate and comprising a plurality of filters operating in different frequency bands, each frequency band comprising at least one of said targeted frequencies, each of said filters providing a modified signal;
    providing said input signal to a third filter bank being controlled by said frequency estimate and extracting a noise signal from said input signal;
    providing said modified signals to a plurality of level control units (LCU) providing normalized modified signals having a constant amplitude;
    providing each of said modified signals and said noise signal to a power estimation module providing a power estimation parameter for each of said modified signals and said noise signal;
    providing said power estimation parameters to a discrimination module controlling a plurality of demodulator modules receiving said normalized modified signals, each of said plurality of demodulator modules providing a fine estimate of one of said targeted frequencies.

16. The tone detector as claimed in claim 2, wherein said first filter bank comprises Goertzel filters.

17. The tone detector as claimed in claim 3, wherein said first filter bank comprises Goertzel filters.

18. The tone detector as claimed in claim 2, wherein said second filter bank comprises adaptive peak filters.

19. The tone detector as claimed in claim 2, wherein said third filter bank comprises notch filters.

20. The tone detector as claimed in claim 2, wherein said plurality of LCUs matches a duration of said normalized modified signals to a duration of said input signal.

\* \* \* \* \*